United States Patent [19]

Kobayashi et al.

[11] Patent Number: 5,276,575
[45] Date of Patent: Jan. 4, 1994

[54] MAGNETIC HEAD HAVING A NOTCHED MAGNETIC CORE PORTION WITH A ZERO DEPTH POSITION OFFSET

[75] Inventors: Tomio Kobayashi; Heikichi Sato; Hideaki Ojima; Akira Urai; Akira Murakami; Yoshito Ikeda; Mitsuaki Yokomizo; Toshiyuki Okada, all of Miyaga, Japan

[73] Assignee: Sony Corporation, Japan

[21] Appl. No.: 845,140

[22] Filed: Mar. 3, 1992

[30] Foreign Application Priority Data

Mar. 6, 1991 [JP] Japan ............... 63724

[51] Int. Cl.⁵ .................. G11B 5/43; G11B 5/47
[52] U.S. Cl. ...................... 360/126; 360/119
[58] Field of Search ........... 360/126, 125, 199-120, 122-123; 242/199

[56] References Cited

U.S. PATENT DOCUMENTS 4,769,729  9/1988  Kumasaka et al. ............ 360/126
4,819,113  4/1989  Kubota et al. ............ 360/122 X
5,047,885  9/1991  Zama et al. ............ 360/126

Primary Examiner—John H. Wolff
Attorney, Agent, or Firm—Ronald P. Kananen

[57] ABSTRACT

Each of a pair of magnetic core halves includes a substrate and a thin magnetic metal film formed on the substrate. The substrate is notched with a winding groove. The pair of the magnetic core halves are integrally bonded to each other so that a gap filling film is formed between the facing surfaces of the thin magnetic metal films. The zero depth position of the magnetic gap which is determined by the length of the facing thin magnetic metal films is offset to a magnetic recording medium sliding surface of the magnetic head from the notching start position of the winding groove on the side of the magnetic gap. Hence, the shape of the thin magnetic metal film exposed on the magnetic recording medium sliding surface is maintained constant from the initial position to the depth zero position.

6 Claims, 4 Drawing Sheets

MAGNETIC HEAD HAVING A NOTCHED MAGNETIC CORE PORTION WITH A ZERO DEPTH POSITION OFFSET

BACKGROUND OF THE INVENTION

The present invention relates to a magnetic head which is used for recording and/or reproducing data on and/or from a magnetic recording medium having a high coercive force such as so-called metal tape.

For example, in the magnetic recording and/or reproducing apparatus such as VCR (video cassette recorder), efforts have been made to record informational signals having a short wave length to provide a high resolution picture. In associated with this, magnetic recording media having a high coercive force such as so-called metal tape using ferromagnetic metal powders such as magnetic powders or vacuum deposited tape in which a ferromagnetic metal material is directly deposited on a base film have been used.

On the other hand, research and development in the field of magnetic head has been made to cope with the advance in the magnetic recording medium. A magnetic head in which a thin magnetic metal film having a high saturation magnetic flux density is adjacent to a magnetic gap which is preferable for the high coercive force magnetic recording medium has been developed. Such a magnetic head comprises a pair of magnetic core halves each including a substrate which is generally made of an oxide magnetic material or non-magnetic material. Thin magnetic metal films are formed on the facing surfaces of the substrates. The magnetic core halves are integrally bonded to each other with fused glass so that a gap film is disposed in a magnetic gap formed between the thin magnetic metal films. Although the thin magnetic metal film adjacent to the magnetic gap is generally a single layer, a laminated film including a multiple of thin magnetic metal films having non-magnetic films interposed therebetween to provide a high output and a broader band has also been proposed.

In the magnetic head having a thin magnetic metal film adjacent to the magnetic gap, it is preferable to continuously extend the thin magnetic metal film from a magnetic recording medium sliding surface of the head to the rear side thereof along a winding groove which is notched in the substrate. If such a continuous thin magnetic metal film is formed, a closed magnetic path is formed by only the thin magnetic metal film. Accordingly, enhancement of the reproduced output can be achieved. In such type magnetic head, the length of the facing portions of the thin magnetic metal films which sandwich a gap film therebetween in a depth direction is defined as the depth of the magnetic gap.

The width of the thin magnetic metal film exposed on the magnetic recording medium sliding surface in a film thickness direction will be gradually widened from a position passing the notching start position of the winding groove provided in the substrate in the side of the magnetic gap due to wearing of the magnetic recording medium sliding surface by the sliding contact with a magnetic recording medium. In other words, the area of the thin magnetic metal film on the magnetic recording medium sliding surface will be increased. After the area of the thin magnetic metal film exposed on the magnetic recording medium sliding surface has been increased, mainly the thin magnetic metal film is worn instead of the substrate on the recording medium sliding surface. Wearing of the thin magnetic metal film is more remarkable than that of the substrate. Therefore, the contour of the magnetic recording medium sliding surface changes with the lapse of use period of time, so that contact of the medium sliding surface of the magnetic head with the magnetic recording medium can not be assured.

In particular, in the magnetic head having a laminated thin magnetic metal film, non-magnetic films interposed between the thin magnetic metal films formed on the winding groove will be exposed on the magnetic recording medium sliding surface in parallel with the magnetic gap after the notching start position of the winding groove whether or not the thin magnetic metal film exposed on the magnetic recording medium sliding surface at the initial phase before use is parallel with the magnetic gap. Since the non-magnetic films are in parallel with the magnetic gap, they function as so-called pseudo magnetic gap which may cause noise in a reproduced signal.

OBJECT AND SUMMARY OF THE INVENTION

The present invention was made in view of the above circumstances of the prior art.

It is an object of the present invention to provide a magnetic head which is capable of maintaining the same area of the thin magnetic metal film exposed on the magnetic recording medium sliding surface as the initial area even when the depth of the magnetic gap is zero and is capable of constantly assuring a good contact of the sliding surface of the magnetic head with a magnetic recording medium.

It is another object of the present invention to provide a magnetic head in which no pseudo magnetic gap is generated.

In order to accomplish the above mentioned object, the present invention provides a magnetic head, comprising a pair of magnetic core halves, at least one of which is notched with a winding groove; and a thin magnetic metal films formed along the facing surfaces of the core halves including the winding grooves of the substrates, the pair of magnetic core halves being integrally bonded to each other in such a manner that a magnetic gap filling film is formed between the facing surfaces of the thin magnetic metal films; characterized in that the position in which the depth of the magnetic gap is zero is offset in the direction of the magnetic recording medium sliding surface from a notching start position of the winding groove on the side of the magnetic gap.

Since the zero depth position of the magnetic gap is offset in the direction of the magnetic recording medium sliding surface from the notching start position of the sliding groove on the side of the magnetic gap in the magnetic head in accordance with the present invention, the area of the thin magnetic metal film adjacent to the magnetic gap exposed on the magnetic recording medium sliding surface is the same as the initial area even when the magnetic recording medium sliding surface is worn to the zero depth position. In other words, the contour of the magnetic recording medium sliding surface is maintained constant from the initial position to the zero depth position. Accordingly, contact of the sliding surface of the magnetic head with the magnetic recording medium is substantially constant until the zero depth position of the magnetic gap, resulting in that the reproduced output characteristics are improved.

DESCRIPTION OF THE PREFERRED EMBODIMENTS

Preferred embodiments of the present invention will now be described with reference to the drawings.

Figure 1:
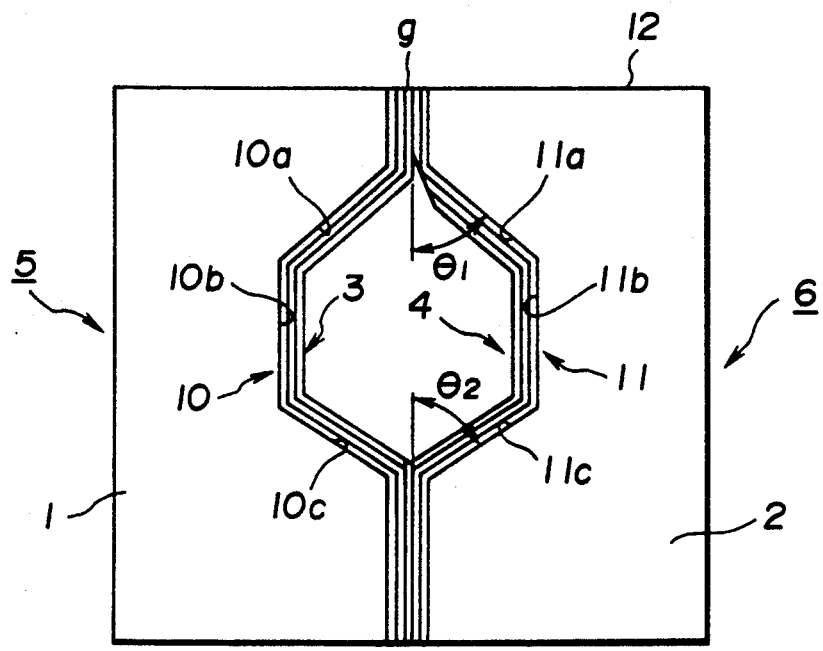
FIG. 1 is an elevational view showing an embodiment of a magnetic head of the present invention.
Figure 2:
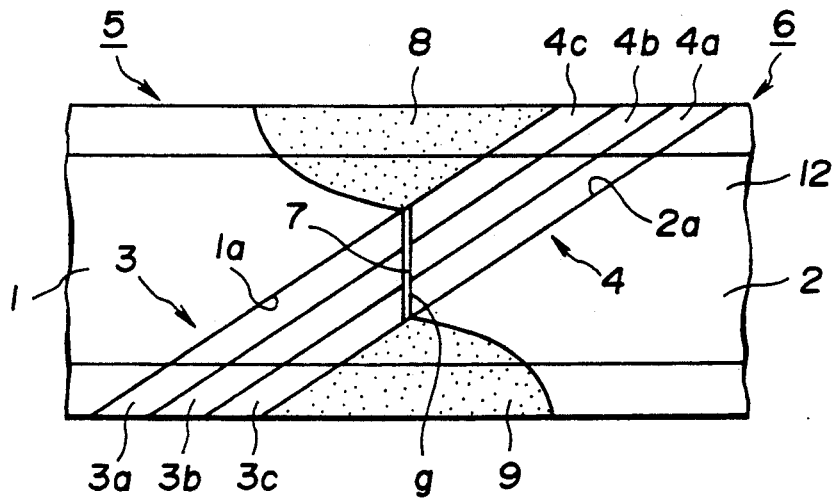
FIG. 2 is an enlarged front view showing a magnetic recording medium sliding surface of the magnetic head shown in FIG. 1.
Figure 3:
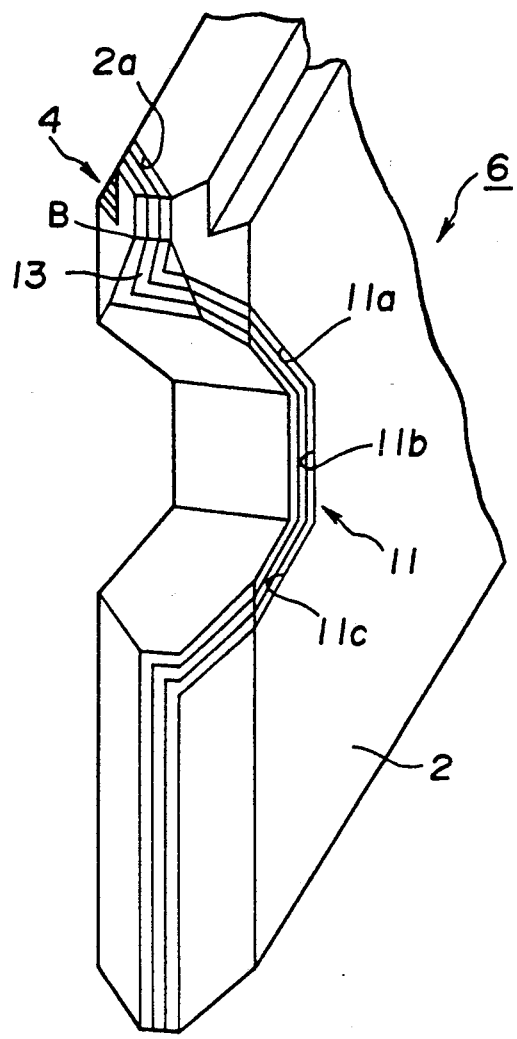
FIG. 3 is a perspective view showing the facing surface of one of the magnetic core halves of the magnetic head shown in FIG. 1.

In an embodiment of the present invention, a magnetic head comprises a pair of magnetic core portions or halves 5 and 6 which include substrates 1 and 2 and magnetic thin films 3 and 4 of a metal, respectively as shown in FIGS. 1 to 3. The magnetic core halves 5 and 6 are integrally bonded to each other with fusing glass 8 and 9 so that a gap film 7 is formed between the facing thin magnetic metal films 3 and 4. A magnetic gap g is formed between the facing surfaces of the magnetic metal thin films 3 and 4.

The magnetic core halves 5 and 6 comprise the substrates 1 and 2 and thin magnetic films 3 and 4 of a metal, respectively and are symmetric with respect to the magnetic gap g. The substrates 1 and 2 are made of an oxide magnetic material such as ferrite or a non-magnetic material such as ceramics and have winding grooves 10, 11 formed in the middle of the facing surfaces of the magnetic core halves in which coils are wound. The winding grooves 10 and 11 comprise first inclined surfaces 10a and 11a which are inclined to the facing surfaces of the magnetic metal thin films 3 and 4 at an angle of $\theta_1$, coil winding surfaces 10b and 11b for winding coils in parallel with the facing surfaces of the magnetic metal thin films 3 and 4 and second inclined surfaces 10c and 11c formed on the side opposite to the first inclined surfaces 10a and 11a which are inclined at an angle of $\theta_2$ with respect to the facing surfaces of the magnetic metal thin films 3 and 4, respectively. The winding grooves 10 and 11 are trapezoidal in shape.

The facing portions of the substrates 1 and 2 in which the winding grooves 10 and 11 are formed are inclined to the magnetic gap and are pointed in plan. Thin magnetic metal films 3 and 4 are continuously formed on the other inclined surfaces 1a and 2a of the pointed facing surfaces from a magnetic recording medium sliding surface 12 to the rear side in the winding grooves 10 and 11, respectively. The thin magnetic metal films 3 and 4 in the winding grooves 10 and 11 are formed in such a manner that they cover over the entire of the inclined surfaces 10a, 10b, 10c and 11a, 11b, 11c, forming the winding grooves 10 and 11, respectively. The thin magnetic metal films 3 and 4 are made of a ferromagnetic material having a high saturated magnetic flux density and an excellent soft magnetic characteristic such as Fe-Al-Si (Sendust) or Fe-Ga-Si-Ru and is formed by the vacuum thin film forming process such as sputtering, vacuum deposition or ionized-cluster ion beam deposition.

Particularly in the present embodiment, the thin magnetic metal films 3 or 4 have a laminate structure in which thin metal films 3a, 3b and 3c or 4a, 4b and 4c are laminated so that non-magnetic films (not shown) made of $SiO_2$, etc. are interposed therebetween, for enhancing the reproduced output in a high frequency range.

In the above mentioned magnetic head, the depth $D_p$ of the magnetic gap is restricted by an inclined surface 13 which is formed by obliquely cutting a part of the thin magnetic metal film 4 in notching start position of the winding groove 11 on the side of the magnetic gap g provided on one of the substrates. The inclined surface 13 is inclined in such a manner that the distance between the thin magnetic metal film 4 and the opposite thin magnetic metal film 3 increases from a position B on the side of the magnetic recording medium sliding surface 12 which is slightly above the notching start position A of the winding groove 11. That is, the depth $D_p$ of the magnetic gap g is restricted by the inclined surface 13 which starts from the position B which is offset slightly above the notching start position A of the winding groove 11 toward the magnetic recording medium sliding surface 12.

Figure 4:
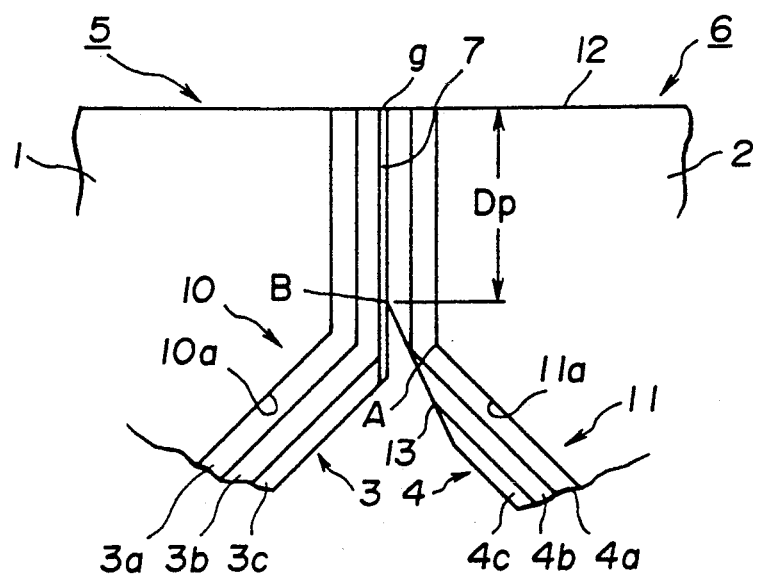
FIG. 4 is an enlarged elevational view showing a magnetic gap of the magnetic head shown in FIG. 1.

As a result of this, in this magnetic head, the area of the thin magnetic metal films 3 and 4 exposed on the magnetic recording medium sliding surface 12 is the same as the initial area of those before use even when the magnetic recording medium sliding surface 12 is worn to a position (position B in FIG. 4) where the depth $D_p$ of the magnetic gap g is zero. Accordingly, the magnetic recording medium sliding surface is constantly worn to a position where the depth $D_p$ is zero without changing the area of the thin films 3 and 4. The magnetic recording medium sliding surface 12 in the zero depth $D_p$ position maintains the initial shape shown in FIG. 2. Therefore, contact of a magnetic recording medium with the sliding surface 12 is maintained constant at least until the sliding surface 12 is worn to the zero depth $D_p$ position, resulting in no deterioration of the reproduced output. Since the magnetic recording medium sliding surface 12 maintains the initial shape even in the zero depth $D_p$ position in this magnetic head, the non-magnetic film which is in parallel with the magnetic gap g functioning as a pseudo-gap will not be exposed on the sliding surface in this zero depth $D_p$ position.

Figure 5:
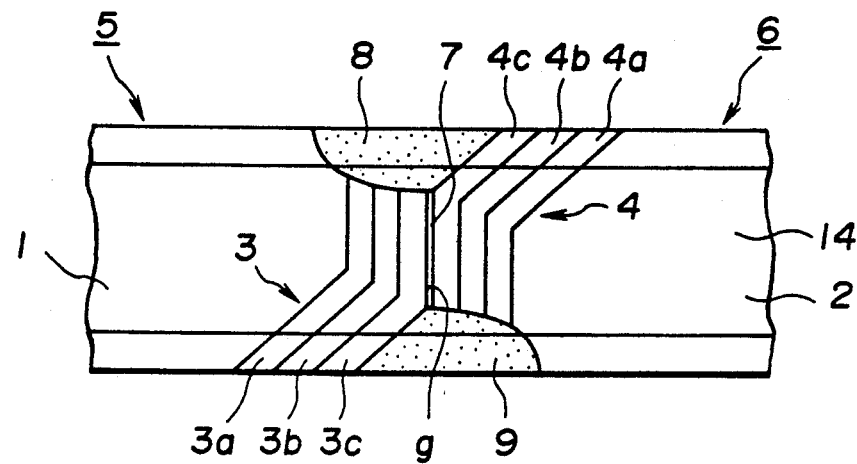
FIG. 5 is an enlarged front view showing the magnetic recording medium sliding surface when a magnetic head which is not formed with an inclined surface for restricting the depth of the magnetic gap has been worn to the zero depth position.

If the thin magnetic metal film 4 is not provided with the inclined surface 13 which restricts the depth $D_p$ of the magnetic gap g, the thin magnetic metal films 3 and 4 formed in the winding grooves 10 and 11, respectively will be exposed on the sliding surface 14 as shown in FIG. 5 when the magnetic recording medium sliding surface 12 is worn to the zero depth $D_p$ position (the position of the facing ends of the thin magnetic metal films 3 and 4). The area of the contact of the exposed thin magnetic metal films 3 and 4 with the recording medium becomes larger than the initial area as shown in FIG. 2. Accordingly, non-magnetic films interposed between the metal films 3a, 3b, and 3c and 4a, 4b, and 4c forming the thin magnetic metal films 3 and 4 will function as a pseudo gap.

Figure 6:
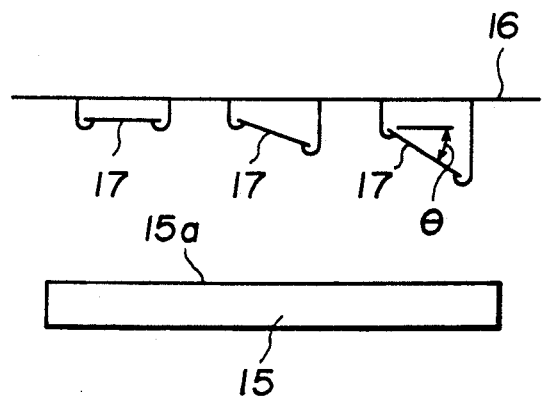
FIG. 6 is a schematic view showing examples in which a thin magnetic metal films are formed on substrates which are at different angles with respect to a target.

The thin magnetic metal films 3 and 4 which are formed in the winding grooves 10 and 11 of the magnetic head respectively, are formed on the first inclined surface 10a and 11a and the second inclined surfaces 10c and 11c, respectively in which the angles $\theta_1$ and $\theta_2$ between the first and second inclined surface and the thin magnetic metal films 3 and 4 in the magnetic gap g are not higher than 60° in order to improve the soft magnetic characteristics of this portion. If the thin magnetic metal films 3 and 4 are formed in such a manner that the inclination angles $\theta_1$ and $\theta_2$ of the first inclined surfaces 10a and 11a and the second inclined surfaces 10c and 11c are not higher than 60°, the permeability of the thin magnetic metal films 3 and 4 formed in this portion are improved and thus the soft magnetic properties are also improved. This is based upon an experiment as follows:

As shown in FIG. 6, substrates 17 made of a head core substrate or ceramics for evaluating the characteristics of metal film were mounted on a sputtering holder 16 which is separated from a target 15 made of a soft magnetic metal alloy by a given distance and in parallel therewith so that the angle $\theta$ between the substrate 17 and the opposite surface 15a of the target 15 falls within a range from 0° to 90°, Fe-Al-Si or Fe-Ga-Si-Ru, etc. were sputtered from the target 15 upon the substrates 17 which are at different angles $\theta$ with respect to the target 15. The permeability and the coercive force of the thin magnetic metal films formed on respective substrate 17 were measured. The results are shown in Table 1. The thin magnetic metal films were 5 $\mu$m in thickness and sputtering was performed under the same conditions.

TABLE 1

| ANGLE | 0° | 10° | 30° | 60° | 70° | 90° |
|---|---|---|---|---|---|---|
| PERMEABILITY | 2000 | 2000 | 1900 | 1500 | 300 | 100 |
| COERSIVE FORCE | 0.1 | 0.1 | 0.2 | 0.2 | 1.2 | 1.5 |

As is apparent from Table 1, the permeability which exceeds the permeability of 600 to 1000 of Mn-Zn ferrite is obtained if the angle $\theta$ is not higher than 60°. If the angle exceeds 70°, the permeability becomes very low and the coercive force becomes high so that the soft magnetic characteristics become worse. This is due to the conformation of atoms forming the soft magnetic thin film. This is caused by the fact that the columnar crystals (formed from the bottom) in the gain boundary are very coarse and have a low density if the angle is not lower than 60° since columnar crystals are formed in a crystal film such as Sendust. Although no columnar crystals are found in an amorphous alloy such as Co-Zn-Nb, the bonding power is weakened and the characteristics of the film deteriorates if the angle $\theta$ is not lower than 60°. From the foregoing, if the inclination angle $\theta_1$ of the inclined surfaces 10a, 10b and 11a, 11b in the winding grooves 10 and 11 are not higher than 60°, the improvement in the permeability of the thin magnetic metal films 3 and 4 in the winding grooves 10 and 11 can be achieved so that a high output head can obtained. The inclination $\theta_2$ of the second inclined surfaces 10c and 11c or the rear side may be 60° to 90° since there is no problem in the output unlike the thin films disposed in the vicinity of the magnetic gap g even if the soft magnetic characteristics of the thin magnetic metal films 3 and 4 formed in this portion are slightly worse.

Figure 7:
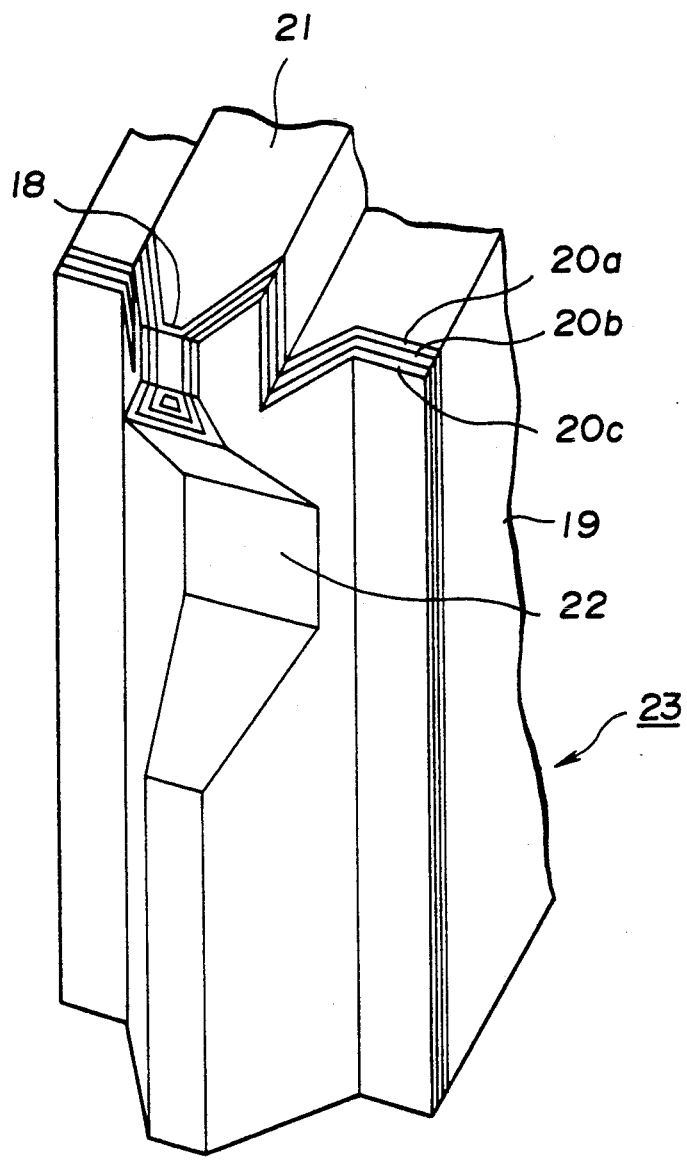
FIG. 7 is a perspective view showing a facing surface of a magnetic core half in another embodiment of the present invention.

Having described one embodiment of a magnetic head of the present invention, various modifications are possible without being limited to the above mentioned embodiment. In the above mentioned magnetic head, the magnetic gap g is formed between the facing surface of the inclined films of thin magnetic metal films 3 and 4. If a magnetic core half 23 (see FIG. 7) including metal films 20a, 20b and 20c which are formed on a non-magnetic film on a facing surface of the substrate 19 having a gap forming surface 18 parallel with the magnetic gap g from a magnetic recording medium sliding surface 21 to the rear side thereof along a winding groove 22 is used and a part of the metal films 20a, 20b and 20c laminated in the notching start position of the winding groove 22 of the magnetic core half 23 is cut away as is similarly to the above mentioned embodiment, the magnetic head including a pair of magnetic core halves 23 can obtain the same effects as the former magnetic head. If a single metal film 20a is formed on the gap forming surface 18 so that the non-magnetic film will not be exposed on the sliding surface 21, a pseudo-gap can be prevented from occurring in the magnetic gap g.

Although metal films are laminated so that non-magnetic films are interposed therebetween in view of output in a high frequency range in both above mentioned embodiments, the thin magnetic metal films may be a single film. If the substrate is formed of an oxide magnetic material, it suffices for some of the thin magnetic metal films formed in the winding groove to include a discontinuous film since a closed magnetic path is formed.

What is claimed is:

1. A magnetic head, comprising a pair of magnetic core portions, each portion including a substrate having a notched winding groove for accommodating a coil winding, said winding grooves formed along facing surfaces of the core portions; and a thin magnetic metal film disposed along facing surfaces of each of the core portions including the winding grooves of the substrates, the pair of magnetic core portions being integrally bonded to each other in such a manner that a magnetic gap is formed between facing surfaces of the thin magnetic metal films;

characterized in that said magnetic gap has a depth defined as the distance from a magnetic recording medium sliding surface on said magnetic core portions to a point B intermediate said magnetic recording medium sliding surface and said winding grooves, and in that an inclined surface extends from said point B on one of said core portions to the respective winding groove of said one of said core portions;

whereby said inclined surface enables said magnetic recording medium sliding surface to maintain a constant sliding surface contact area of said thin magnetic metal films until the sliding surface is worn to a position in which the depth of the magnetic gap is zero.

2. A magnetic head as defined in claim 1 in which said inclined surface is cut away in an oblique manner with respect to the facing surfaces of the thin magnetic metal films so that the zero depth position of the magnetic gap is offset in the direction of the magnetic recording medium sliding surface from the winding grooves.

3. A magnetic head as defined in claim 1 in which the thin magnetic metal film is a multilayered film including metal films and non magnetic films.

4. A magnetic head as defined in claim 1 in which the thin magnetic metal film is disposed obliquely with respect to the magnetic gap in the magnetic recording medium sliding surface.

5. A magnetic head as defined in claim 1 in which the angle of inclination of the winding groove on the side of the magnetic gap with respect to the facing surfaces of the thin films is not higher than 60°.

6. A magnetic head as defined in claim 1 further comprising a magnetic gap filling film disposed in said magnetic gap.

* * * * *